(12) United States Patent
Wnek et al.

(10) Patent No.: US 9,808,117 B2
(45) Date of Patent: Nov. 7, 2017

(54) TOOL FOR FORMING A THREE DIMENSIONAL ARTICLE OR CONTAINER

(71) Applicant: Graphic Packaging International, Inc., Atlanta, GA (US)

(72) Inventors: Patrick H. Wnek, Sherwood, WI (US); Ronald P. Marx, Freemont, WI (US)

(73) Assignee: Graphic Packaging International, Inc., Atlanta, GA (US)

( * ) Notice: Subject to any disclaimer, the term of this patent is extended or adjusted under 35 U.S.C. 154(b) by 806 days.

(21) Appl. No.: 14/261,493

(22) Filed: May 1, 2014

(65) Prior Publication Data

US 2014/0231420 A1 Aug. 21, 2014
US 2015/0053672 A9 Feb. 26, 2015

Related U.S. Application Data

(60) Division of application No. 12/425,417, filed on Apr. 17, 2009, now Pat. No. 8,801,995, which is a
(Continued)

(51) Int. Cl.
H05B 6/80 (2006.01)
B29D 19/08 (2006.01)
(Continued)

(52) U.S. Cl.
CPC ............ *A47J 36/027* (2013.01); *B21D 22/02* (2013.01); *B21D 45/02* (2013.01); *B65D 1/34* (2013.01); *B31B 2201/223* (2013.01); *B31B 2201/2654* (2013.01); *B31B 2201/2695* (2013.01); *B31B 2203/00* (2013.01)

(58) Field of Classification Search
CPC .......... B21D 45/02; B21D 22/02; B65D 1/34; B65D 1/48; A47J 36/027; B31B 2201/223; B31B 2201/2654; B31B 2201/2695; B31B 2203/00
USPC ........ 219/725, 730; 264/252, 266, 294, 320, 264/325, 328.12, 500, 154; 425/112, 125, 425/129.1, 351, 394, 415, 398, 412, 400; 72/358, 344, 339
See application file for complete search history.

(56) References Cited

U.S. PATENT DOCUMENTS 2,522,397 A 9/1950 Palmer
2,634,880 A 4/1953 Gravatt
(Continued)

FOREIGN PATENT DOCUMENTS

EP 082209 A 6/1983
EP 1 332 972 A 8/2003
(Continued)

OTHER PUBLICATIONS

International Search Report and Written Opinion for PCT/US2007/081743, dated May 28, 2008.
(Continued)

*Primary Examiner* — Hung D Nguyen
(74) *Attorney, Agent, or Firm* — Womble Carlyle Sandridge & Rice, LLP

(57) ABSTRACT

A forming tool assembly and method for forming a cooking element. The forming tool assembly has an upper tool assembly and a lower tool assembly that cooperate to shape the cooking element from an annular cutout.

17 Claims, 11 Drawing Sheets

Related U.S. Application Data continuation of application No. PCT/US2007/081743, filed on Oct. 18, 2007.

(60) Provisional application No. 60/829,976, filed on Oct. 18, 2006.

(51) Int. Cl.
| | |
|---|---|
| *B29C 59/02* | (2006.01) |
| *B29C 43/00* | (2006.01) |
| *B29D 5/00* | (2006.01) |
| *B29C 45/14* | (2006.01) |
| *A47J 36/02* | (2006.01) |
| *B65D 1/34* | (2006.01) |
| *B21D 22/02* | (2006.01) |
| *B21D 45/02* | (2006.01) |

(56) References Cited

U.S. PATENT DOCUMENTS

| | | | |
|---|---|---|---|
| 3,099,377 A | 7/1963 | Metzler et al. | |
| 3,286,876 A | 11/1966 | Ring | |
| 3,680,733 A | 8/1972 | Winslow | |
| 3,684,633 A | 8/1972 | Haase | |
| 4,139,115 A | 2/1979 | Robinson | |
| 4,183,435 A | 1/1980 | Thompson et al. | |
| 4,704,510 A | 11/1987 | Matsui | |
| 4,755,126 A | 7/1988 | Leverenz | |
| 4,775,771 A | 10/1988 | Pawlowski et al. | |
| 4,832,676 A * | 5/1989 | Johns | B31F 1/0077 264/320 |
| 4,865,921 A | 9/1989 | Hollenberg et al. | |
| 4,890,439 A | 1/1990 | Smart | |
| 4,935,089 A | 6/1990 | Schirmer | |
| 4,936,935 A | 6/1990 | Beckett | |
| 4,963,424 A | 10/1990 | Beckett | |
| 5,039,364 A | 8/1991 | Beckett et al. | |
| 5,117,078 A | 5/1992 | Beckett | |
| 5,190,209 A | 3/1993 | Gordon et al. | |
| 5,213,902 A | 5/1993 | Beckett | |
| 5,221,419 A | 6/1993 | Beckett | |
| 5,260,537 A | 11/1993 | Beckett | |
| 5,266,386 A | 11/1993 | Beckett | |
| 5,269,717 A | 12/1993 | Tardif | |
| RE34,683 E | 8/1994 | Maynard et al. | |
| 5,340,436 A | 8/1994 | Beckett | |
| 5,354,973 A | 10/1994 | Beckett | |
| 5,410,135 A | 4/1995 | Pollart et al. | |
| 5,424,517 A | 6/1995 | Habeger, Jr. et al. | |
| 5,519,195 A | 5/1996 | Keefer et al. | |
| 5,628,921 A | 5/1997 | Beckett | |
| 5,672,407 A | 9/1997 | Beckett | |
| 5,758,773 A | 6/1998 | Clements | |
| 5,759,422 A | 6/1998 | Schmelzer et al. | |
| 5,800,724 A | 9/1998 | Habeger et al. | |
| 5,934,472 A | 8/1999 | Ramirez et al. | |
| 6,114,679 A | 9/2000 | Lai et al. | |
| 6,150,646 A | 11/2000 | Lai et al. | |
| 6,204,492 B1 | 3/2001 | Zeng et al. | |
| 6,251,451 B1 | 6/2001 | Zeng | |
| 6,414,290 B1 | 7/2002 | Cole et al. | |
| 6,433,322 B2 | 8/2002 | Zeng et al. | |
| 6,455,827 B2 | 9/2002 | Zeng | |
| 6,527,687 B1 * | 3/2003 | Fortney | B26F 1/40 493/142 |
| 6,552,315 B2 | 4/2003 | Zeng et al. | |
| 6,592,357 B1 | 7/2003 | Johns et al. | |
| 6,677,563 B2 | 1/2004 | Lai | |
| 6,717,121 B2 | 4/2004 | Zeng et al. | |
| 6,765,182 B2 | 7/2004 | Cole et al. | |
| 6,988,654 B2 | 1/2006 | Wnek | |
| 7,419,462 B1 | 9/2008 | Zelinski | |
| 7,845,935 B2 * | 12/2010 | Johns | B29C 45/4005 425/351 |
| 8,197,740 B2 | 6/2012 | Spengler | |
| 2005/0109653 A1 | 5/2005 | Wnek et al. | |
| 2005/0230383 A1 * | 10/2005 | Romeo | B65D 81/3453 219/730 |
| 2006/0198972 A1 | 9/2006 | Ueda et al. | |

FOREIGN PATENT DOCUMENTS

| | | |
|---|---|---|
| FR | 2 733 715 | 11/1996 |
| GB | 1 348 370 | 3/1974 |
| GB | 2 171 048 A | 8/1986 |
| JP | U 54-126887 | 2/1953 |
| JP | 47-23456 | 10/1972 |
| JP | 54-116059 | 9/1979 |
| JP | 56065866 U | 6/1981 |
| JP | 59-75004 | 4/1984 |
| JP | 60-96234 | 7/1985 |
| JP | 3-4582 | 1/1991 |
| JP | 3057020 U | 5/1991 |
| JP | 6000843 | 1/1994 |
| JP | 7-28833 | 5/1995 |
| JP | 08-156944 | 6/1996 |
| JP | 08-337235 | 12/1996 |
| JP | 09-254948 | 9/1997 |
| JP | 2000-043840 | 2/2000 |
| JP | 2000-142825 | 5/2000 |
| JP | 2000-238760 | 9/2000 |
| JP | 2000-335550 | 12/2000 |
| JP | 2001-213420 | 8/2001 |
| JP | 2001-328617 | 11/2001 |
| WO | WO 03/066435 | 8/2003 |
| WO | WO 03/078012 | 9/2003 |
| WO | WO 2004-033324 | 4/2004 |
| WO | WO 2008/049048 | 4/2008 |
| WO | WO 2009/086501 | 7/2009 |
| WO | WO 2009/088904 | 7/2009 |

OTHER PUBLICATIONS

Supplementary European Search Report for EP 03 77 6279 dated Jan. 28, 2008.
Office Action dated Sep. 21, 2012, for U.S. Appl. No. 12/425,417.
Response to Restriction Requirement dated Oct. 18, 2012, for U.S. Appl. No. 12/425,417.
Office Action dated Apr. 25, 2013, for U.S. Appl. No. 12/425,417.
Amendment A and Response to Office Action dated Jul. 24, 2013, for U.S. Appl. No. 12/425,417.
Office Action dated Dec. 24, 2013, for U.S. Appl. No. 12/425,417.
Amendment B and Response to Office Action dated Mar. 28, 2014, for U.S. Appl. No. 12/425,417.
Notice of Allowance and Fee(s) Due dated Apr. 14, 2014, for U.S. Appl. No. 12/425,417.

* cited by examiner

TOOL FOR FORMING A THREE DIMENSIONAL ARTICLE OR CONTAINER

CROSS-REFERENCE TO RELATED APPLICATIONS

This application is a divisional of U.S. patent application Ser. No. 12/425,417, filed Apr. 17, 2009, which application is a continuation of PCT Application No. PCT/US2007/081743 filed Oct. 18, 2007, which PCT application claims the benefit of U.S. Provisional Application No. 60/829,976 filed Oct. 18, 2006.

INCORPORATION BY REFERENCE

The disclosures of U.S. patent application Ser. No. 12/425,417, which was filed on Apr. 17, 2009, PCT Application No. PCT/US2007/081743, which was filed on Oct. 18, 2007, and U.S. Provisional Application No. 60/829,976, which was filed on Oct. 18, 2006, are hereby incorporated by reference for all purposes as if presented herein in their entirety.

BACKGROUND OF THE INVENTION

The present invention relates to tools and methods for forming materials into articles, elements or containers that may be used to hold, contain, or prepare food products or other products.

SUMMARY OF THE INVENTION

In one aspect, the invention is generally directed to a tool for forming a cooking element form a cutout. The tool has a clamping feature that holds a portion of the cutout in a fixed position during formation of the cooking element.

In another aspect, the invention is generally directed to a tool for forming a cooking element from a cutout. The tool comprises a first tool assembly and a second tool assembly. At least one of the first tool assembly and the second tool assembly is moveable between an open position wherein the cutout is received between the first and the second tool assembly and a closed position wherein the cutout is formed into the cooking element. The first and the second tool assembly have a cooperating clamping feature that holds a portion of the cutout in a fixed position during formation of cooking element.

In another aspect, the invention is generally directed to a method of forming a cooking element. The method comprises providing a tool and a cutout to be formed into the cooking element and clamping the cutout between a clamping feature of the tool to hold a portion of the cutout in a fixed position during formation of the cooking element.

In another aspect, the invention is generally directed to a method of forming a cooking element. The method comprises providing a tool comprising a first tool assembly and a second tool assembly. The first and second tool assemblies have a cooperating clamping feature. The method further comprises providing a cutout comprising material to be formed into the cooking element and clamping the cutout between the clamping feature of the first tool assembly and the second tool assembly. The method further comprises positioning the first and second tool assemblies in a closed position to press the cutout between the tool assemblies and form the cutout into the cooking element, while maintaining a portion of the cutout in a substantially fixed position.

In another aspect, the invention is generally directed to a method of forming a cooking element. The method comprises providing a tool comprising a first tool assembly and a second tool assembly and cutting an annular cutout from a blank. The annular cutout has an outer radial edge, an inner radial edge, and an opening adjacent the inner radial edge. The method further comprises positioning the tool in an open position wherein the first tool assembly and the second tool assembly are spaced apart to form a receiving space therebetween, conveying the annular cutout to the tool in the open position and placing the cutout between the first and second tool assembly. The method further comprises closing the tool so that the first and second tool assemblies form the annular cutout into a cooking ring.

In another aspect, the invention is generally directed to a cooking element for heating a food product. The cooking element comprises a generally annular body comprising a lower edge portion, an upper edge portion, a curved portion between the lower and upper edge portions, and an annular groove between the upper edge portion and the curved portion.

In another aspect, the invention is generally directed to a cooking element formed from any of the various methods as shown and/or described herein.

In another aspect, the invention is generally directed to a cooking element formed from a forming tool having any of the various features shown and/or described herein.

Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the invention.

BRIEF DESCRIPTION OF THE DRAWINGS

Corresponding parts are designated by corresponding reference numbers throughout the drawings.

DETAILED DESCRIPTION OF THE EXEMPLARY EMBODIMENTS

The present invention relates generally to various aspects of materials, packages, elements, articles, containers and methods of making such materials, packages, elements, articles and containers. Although several different inventions, aspects, implementations, and embodiments of the various inventions are provided, numerous interrelationships between, combinations thereof, and modifications of the various inventions, aspects, implementations, and embodiments of the inventions are contemplated hereby. In one illustrated embodiment, the present invention relates to forming a heating or cooking element for microwave cooking of food items. However, in other embodiments, the invention can be used to form articles or containers not used for microwave cooking.

Figure 2:
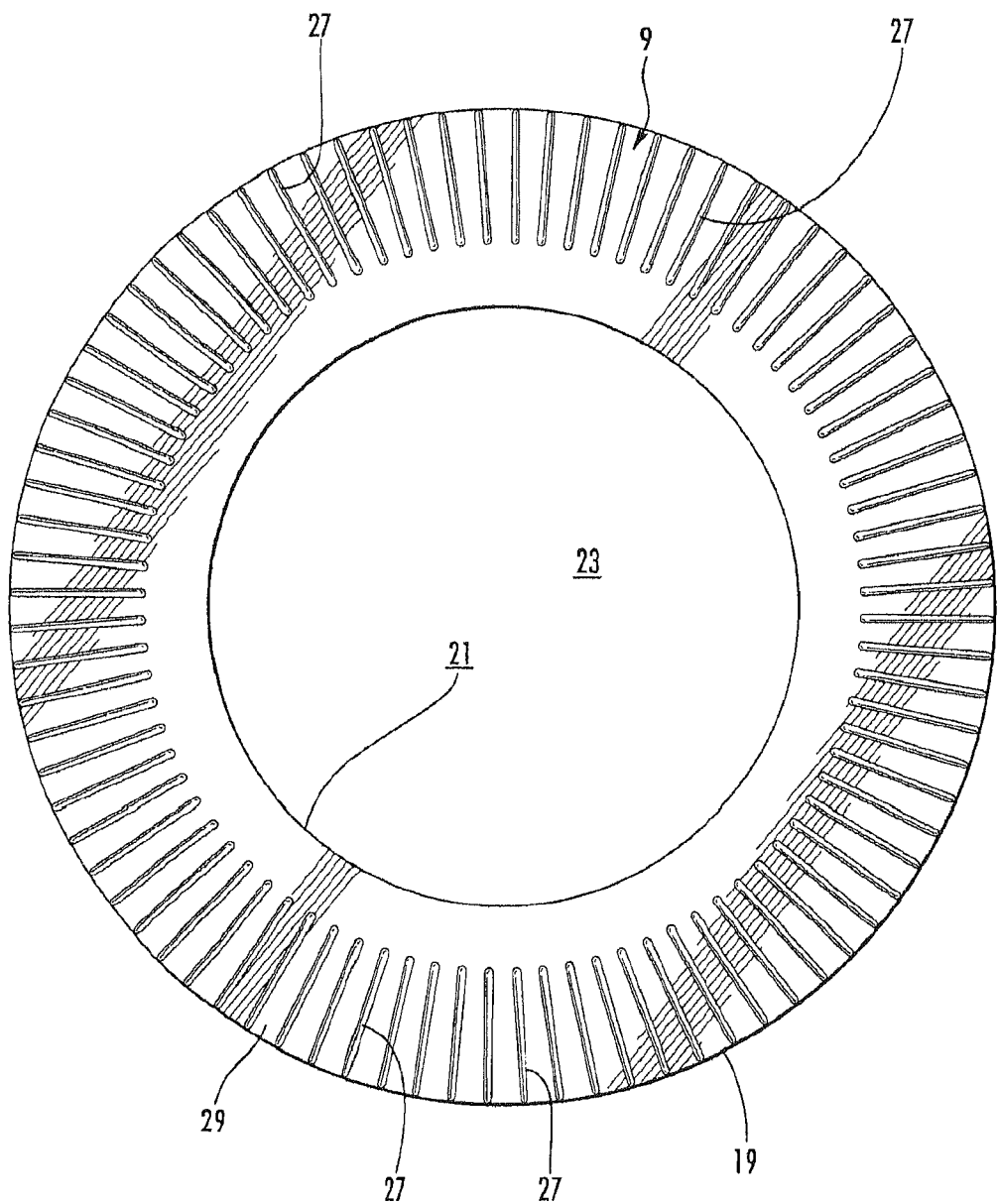
FIG. 2 is a bottom plan view of the annular cutout of FIG. 1.
Figure 3:
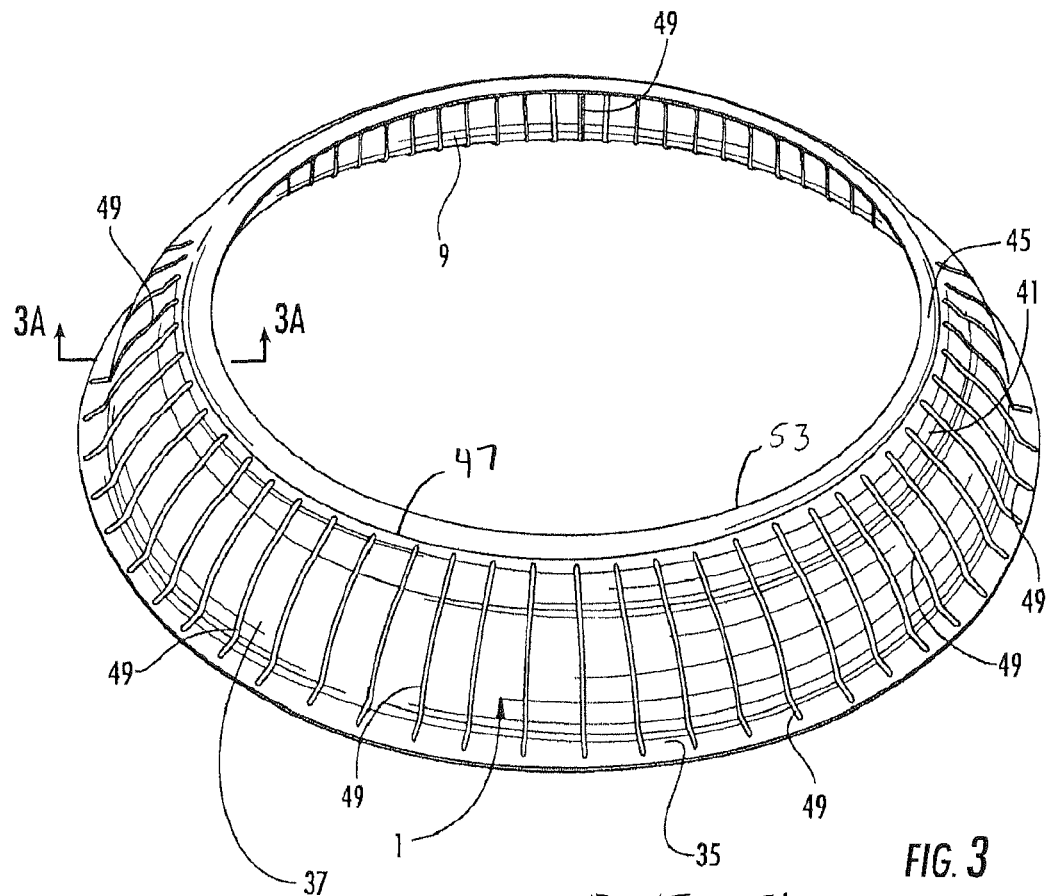
FIG. 3 is a schematic of the cooking element formed from a forming tool of an exemplary embodiment of the present invention.
Figure 6:
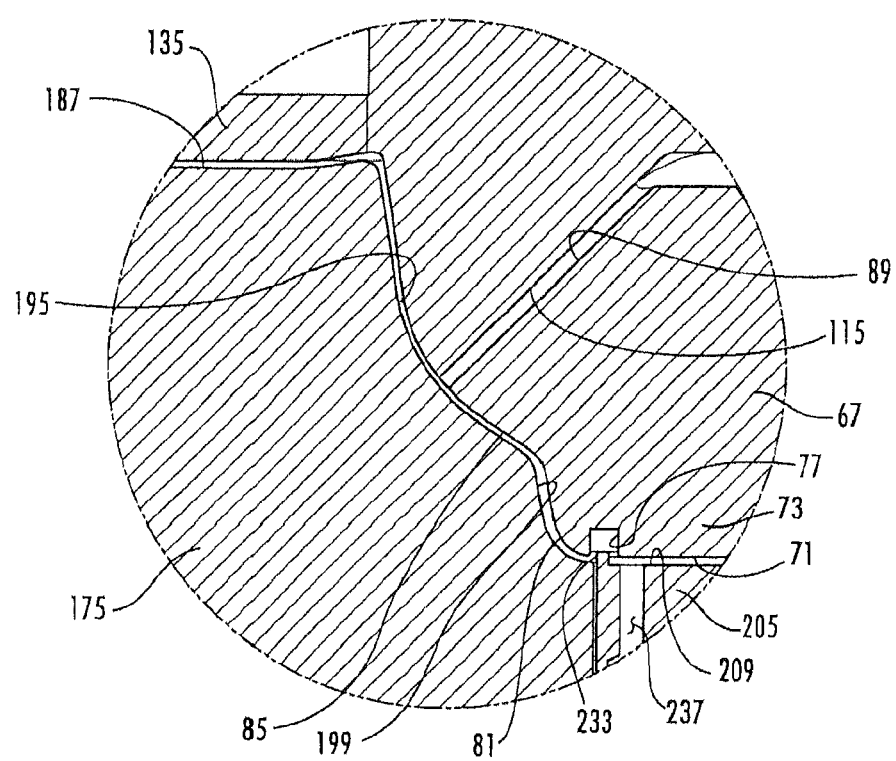
FIG. 6 is an enlarged portion of FIG. 5.

FIG. 3 is a perspective view of a cooking element in the form of a cooking ring, generally indicated at 1, used to cook a food product (not shown) such as a frozen pizza. The cooking ring 1 is formed from an annular cutout 5 (FIGS. 1 and 2) that is cut from a paperboard blank (not shown) having at least one layer of microwave interactive material 9 (FIG. 2) attached thereto (e.g., covering an entire interior surface 29 of the cutout). In accordance with the exemplary embodiment of the present invention, the microwave interactive material 9 is, or at least includes, a susceptor, although other types and various combinations of microwave interactive elements are also within the scope of the present invention, as will be discussed in greater detail below. As will be discussed below in more detail, the cooking ring 1 is shaped from the annular cutout 5 by a forming tool assembly, generally indicated at 15 (FIG. 6).

Figure 1:
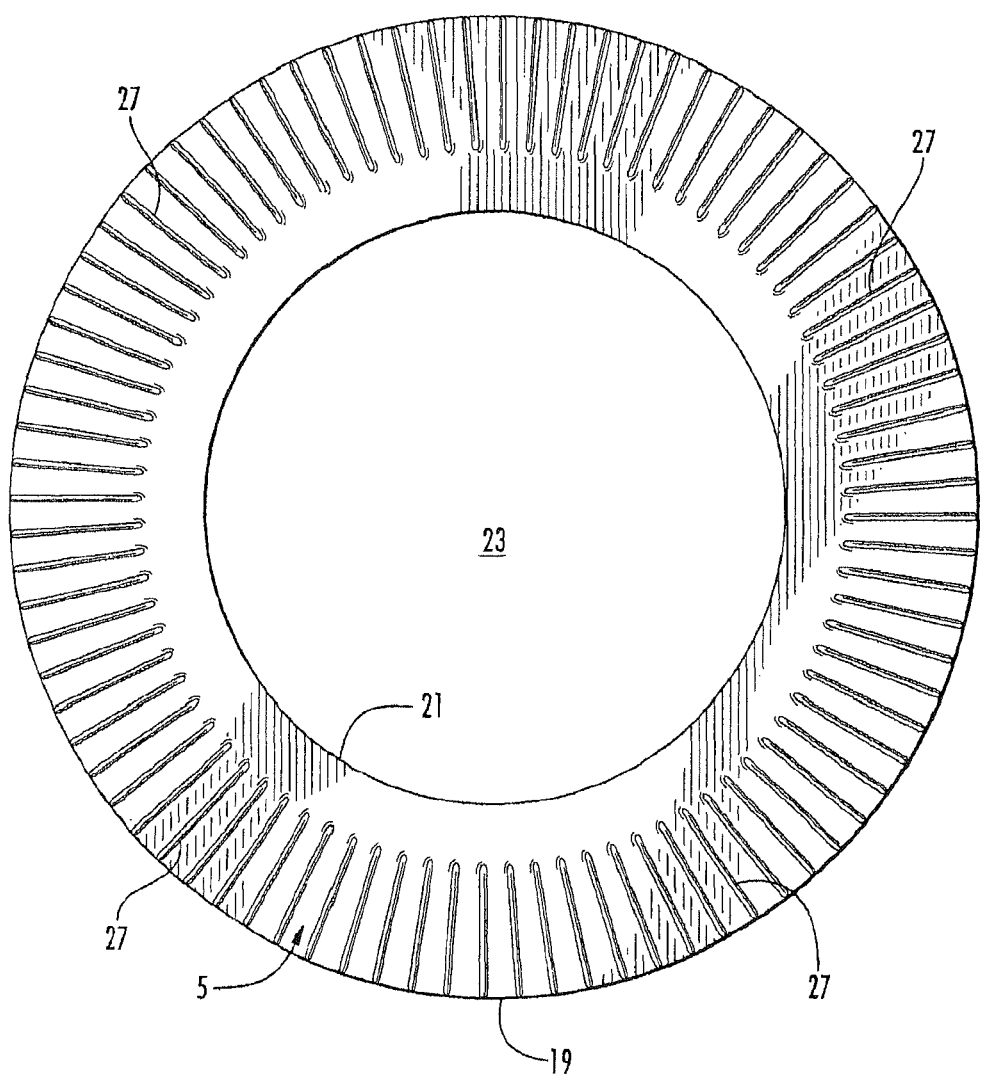
FIG. 1 is a top plan view of an annular cutout used to form a cooking element of an exemplary embodiment of the present invention.

As shown in FIGS. 1 and 2, the annular cutout 5 has an outer radial edge 19 and an inner radial edge 21 defining a center opening 23. The cutout 5 has a plurality of radially directed uniformly spaced score lines 27 that are typically formed on the interior surface 29 of the cutout in a manner so that the integrity of the microwave interactive material 9 is maintained or at least substantially maintained. In the illustrated embodiment the score lines 27 extend from the outer radial edge 19 of the cutout 5 to a location radially spaced from the inner radial edge of the 21. The score lines 27 create weak areas within the paperboard. The weak areas facilitate the shaping and forming of the annular cutout 5 into the cooking ring 1 by a die-forming process using the forming tool 15 of the present invention. Nonetheless, the score lines 27 may possibly be omitted.

Figure 3A:
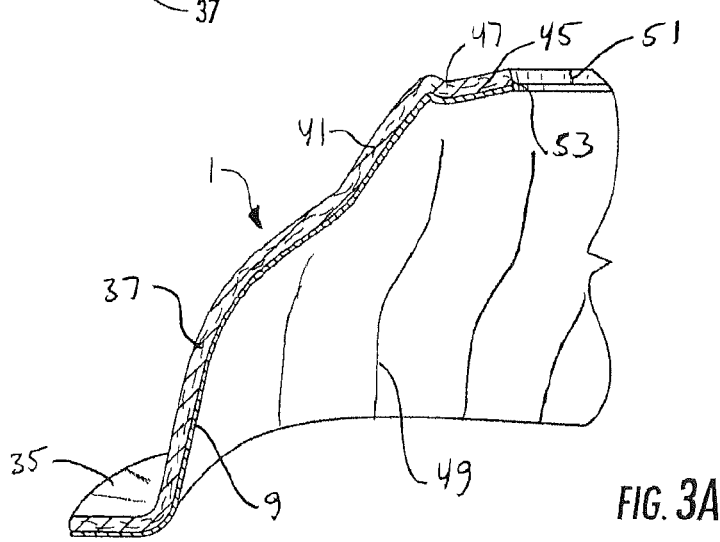
FIG. 3A is a cross-section including the plane 3A-3A of FIG. 3.
Figure 4:
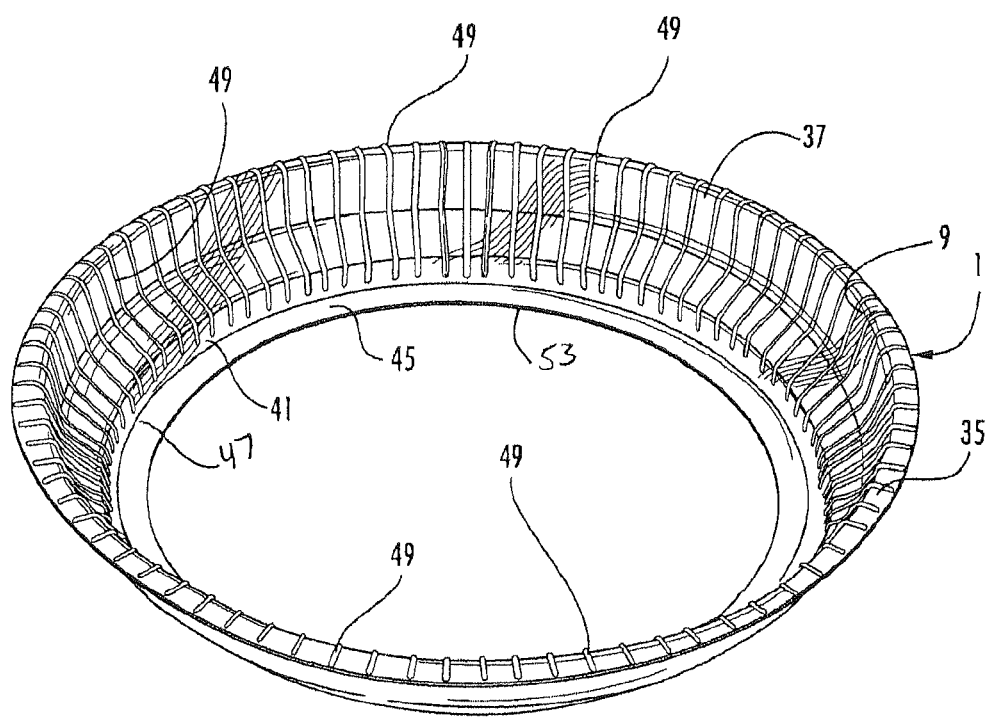
FIG. 4 is a schematic of the cooking element of FIG. 3.

As shown in FIGS. 3 and 4, the cooking ring 1 has a generally flat, lower circumferential edge portion 35, a first curved portion 37 extending axially upward from the lower circumferential edge portion, a second curved portion 41 extending axially upward from the first curved portion, and a generally flat, upper circumferential edge portion 45 extending radially inward from the second curved portion. The upper edge portion 45 has an annular groove 47 (FIG. 3A) adjacent the second curved portion 41. The cooking ring 1 has an opening 51 defined by an inner radial edge 53 that generally corresponds to the opening 23 of the annular cutout 5. During formation of the cooking ring 1 from the annular cutout 5, the weak areas in the paperboard at the score lines 27 of the cutout cause the accumulation of excess paperboard into folds or pleats 49 which are then compressed to strengthen the cooking ring. The pleats 49 allow portions of the paperboard material to overlap and bend during the forming process to form the desired cross-sectional shape of the cooking ring 1.

Figure 5:
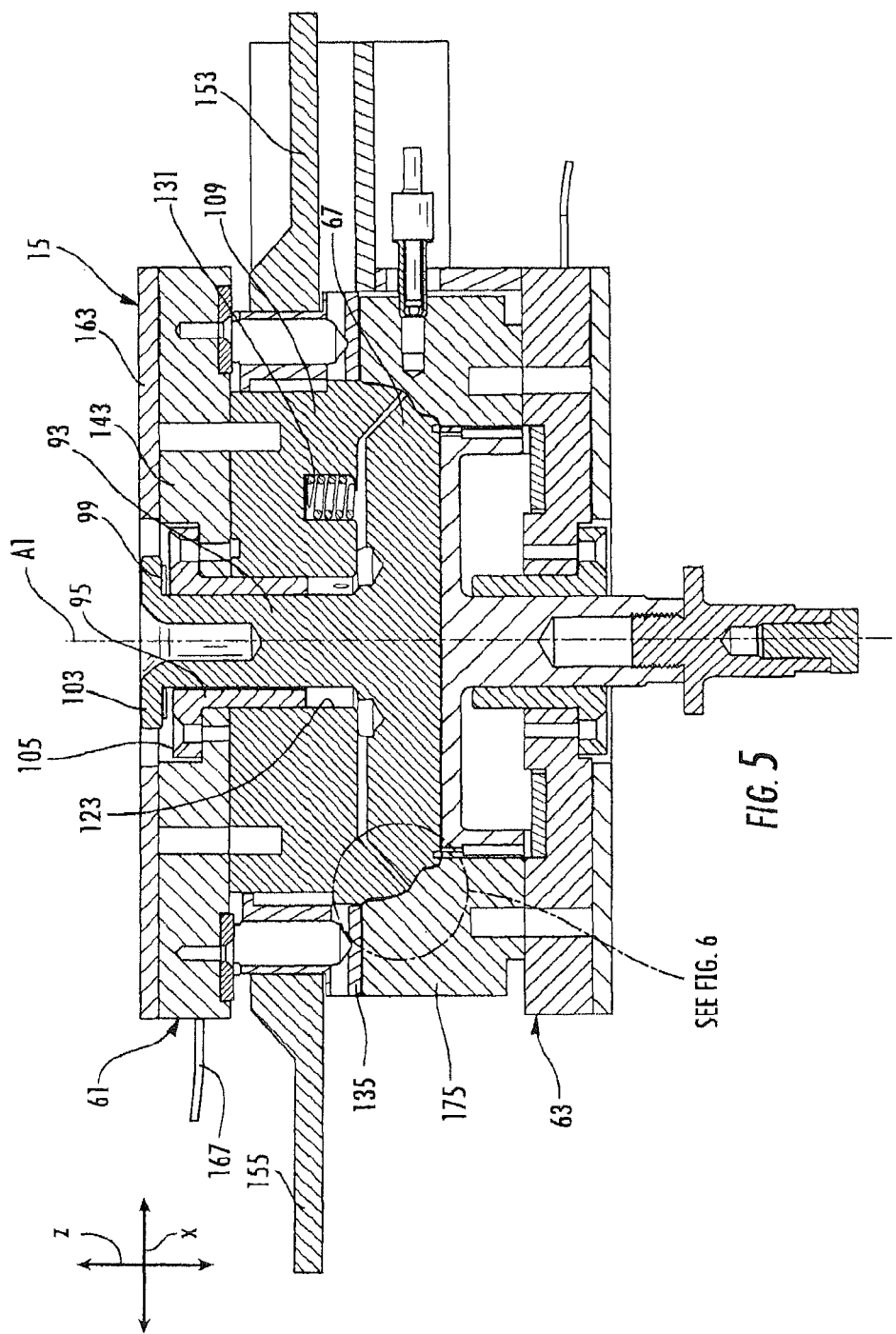
FIG. 5 is a cross-section of the forming tool in a closed position.

FIG. 5 is a sectional view of the forming tool 15 used to form a three-dimensional article or container such as the cooking ring 1. In the illustrated embodiment, the tool 15 includes an upper (first) tool assembly 61 and a lower (second) tool assembly 63. The upper and lower tool assemblies 61 and 63 are independently moveable in the vertical direction Z along a central axis A1 of the assembly to form the annular cutout 5 into the cooking ring 1. It is understood that the upper and lower tool assemblies 61, 63 are moved in the vertical direction Z from the position shown in FIG. 5 to form a gap between the assemblies so that an annular cutout 5 traveling in the horizontal direction X is located between the upper and lower tool assemblies prior to the forming process.

Figure 7:
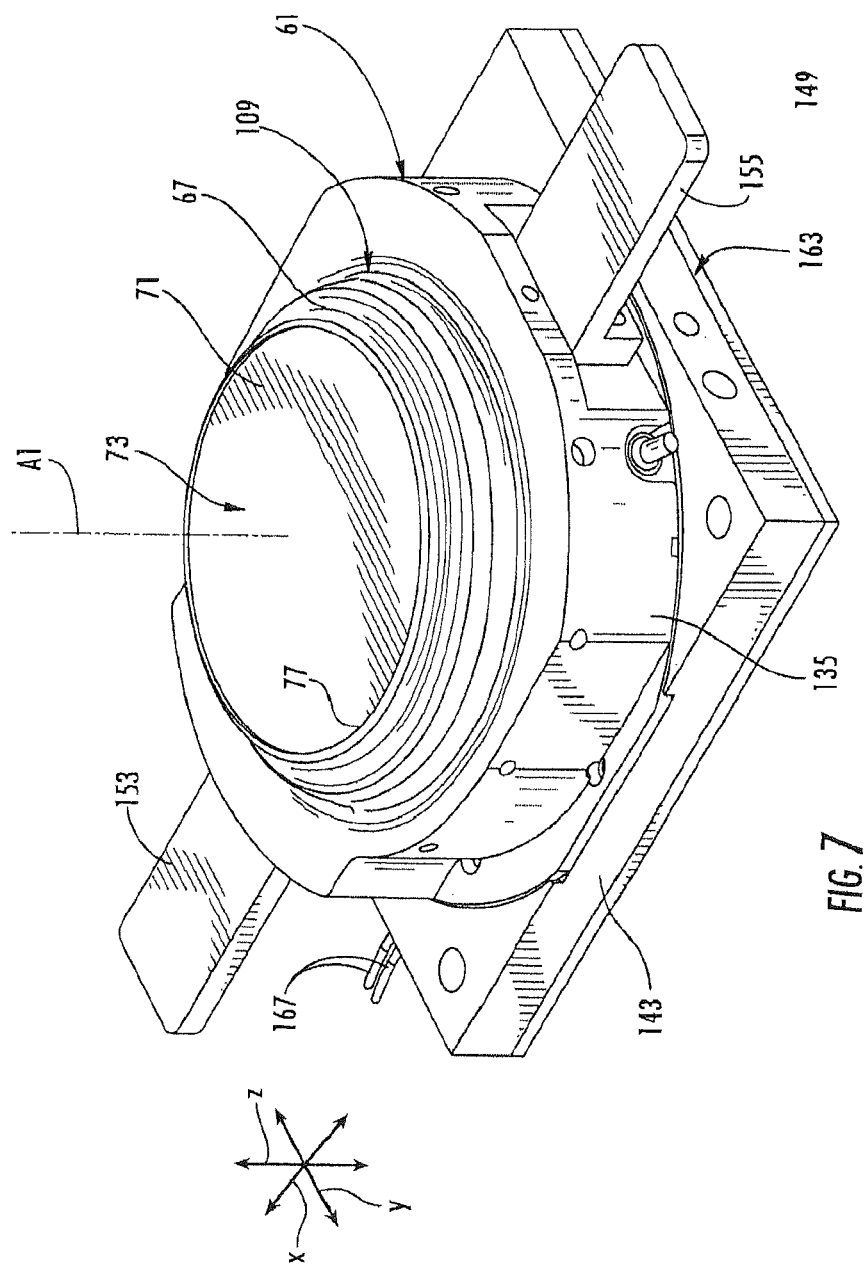
FIG. 7 is a perspective of an upper tool assembly of the forming tool.
Figure 8:
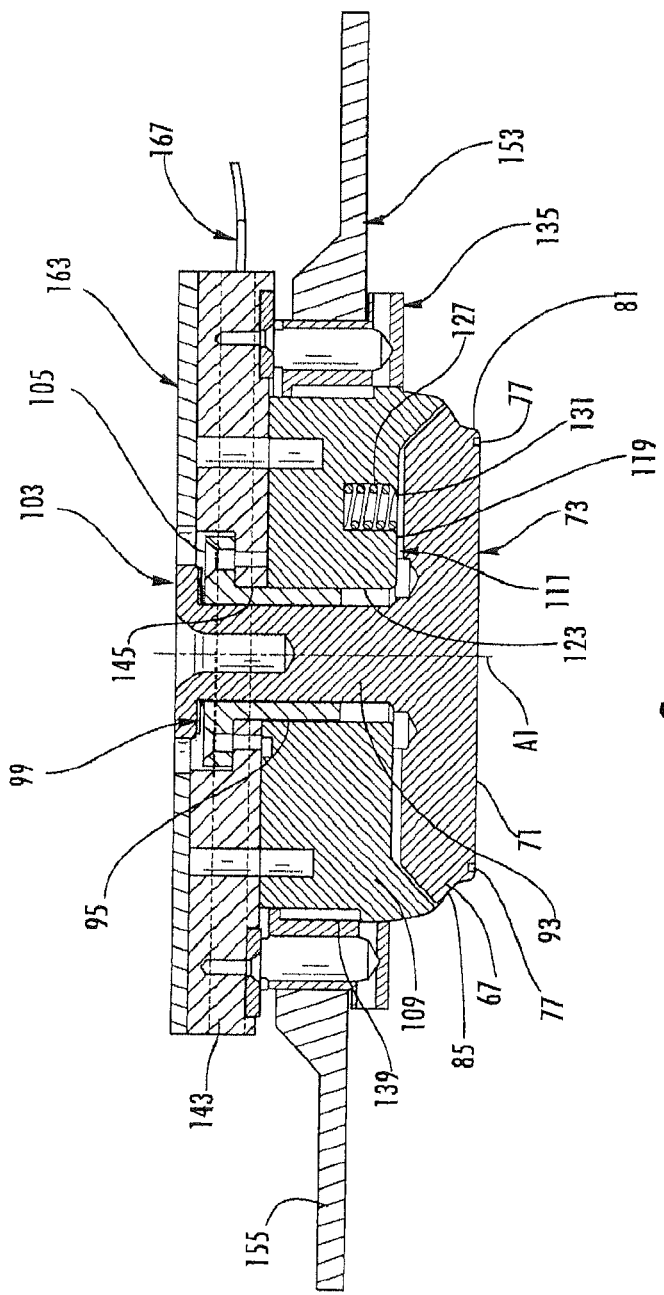
FIG. 8 is a cross-section of the upper tool assembly.

As shown in FIGS. 6 and 8, the upper tool assembly 61 has an nose 67 with a flat axial end surface 71 forming a first axial end 73 of the upper tool assembly. As shown in FIG. 7, the axial end 73 includes an annular groove 77 generally adjacent a first curved radial surface 81 of the nose 67. In the illustrated embodiment, the annular groove 77 has a square cross-sectional shape, but it is understood that the groove could have other shapes and be otherwise located. The nose 67 has a second curved radial surface 85 that is adjacent to an angled conical surface 89 of the nose. A cylindrical shaft 93 (FIG. 5) of the nose 67 is received in a guide bushing 95 of the upper tool assembly 61. In the illustrated embodiment, the upper tool assembly 61 includes a shim 99 on a flange 103 connected to the cylindrical shaft 93. The shim 99 and flange 103 limit the downward travel of the nose 67 by contact with the axial end surface 105 of the guide bushing 95. The thickness of the shim 99 can be changed to affect the distance of travel of the nose 67.

The upper tool assembly 61 includes a punch 109 having an axial end 111 that includes a radially outer, angled surface 115 (FIG. 6) and a radially inner, flat annular surface 119 (FIG. 8). The punch 109 has an axial opening 123 that receives the guide bushing 95 and cylindrical shaft 93 of the nose 67. The punch 109 has a cylindrical recess 127 in the flat annular surface 119 that receives a coil spring 131 for applying a force against the nose 67. During downward travel of upper tool assembly 61, the spring 131 optionally allows the nose 67 to be spaced apart from the punch 109 to accommodate bulging of the annular cutout 5 when the score lines 27 are overlapped to form the cooking ring 1. Alternatively, the upper tool assembly 61 can be configured so that the nose 67 travels in unison with the punch 90. The nose 67 can be fixedly attached to the punch 109 or the nose and the punch can combined into a single component for use in forming the cooking element 1 without departing from the invention. In some embodiments of the invention, additional shims 99 may be added to limit the downward travel of the nose 67 so that the nose and the punch 109 move together (e.g., with the conical surface 89 (FIG. 6) of the nose in contact with the angled surface 115 of the punch). In some embodiments, operation of the upper tool assembly with the nose 67 and punch 109 moving together in unison may be beneficial to reduce wear within the forming tool 15.

The upper tool assembly 61 includes a clamp ring 135 attached to an outer radial surface 139 of the punch 109 by radially directed fasteners (not shown). The clamp ring 135 is attached to a base plate 143 by axially directed fasteners (not shown). The base plate 143 has an axial opening 145 for receiving the cylindrical shaft 93 of the nose 67 and the guide bushing 95. Support brackets 153, 155 are attached to the clamp ring 135 on respective opposite sides of the clamp ring. As shown in FIGS. 7 and 8, the upper tool assembly 61 includes an insulator sheet 163 attached to the outer axial end surface of the base plate 143. A heater 167 is connected to the base plate 143 for heating the upper tool assembly 61. The upper tool assembly 61 includes an actuator (e.g., air cylinders, springs, or other actuating device(s) not shown) respectively connected to each of the brackets 153, 155 for activating the clamp ring 135.

Figure 9:
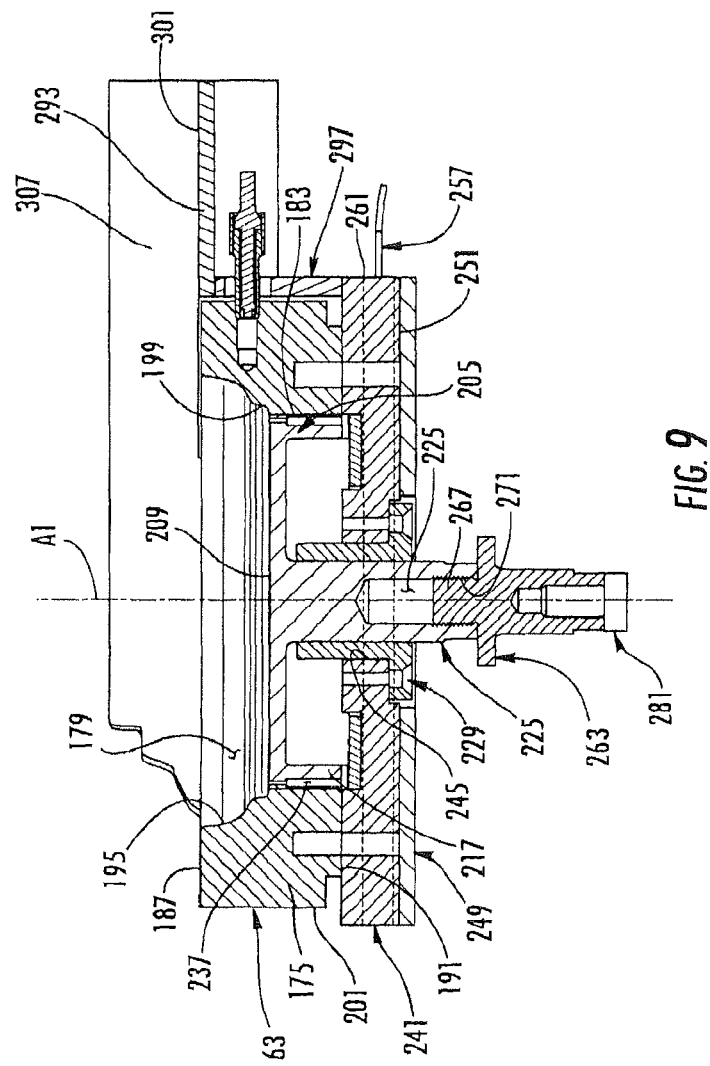
FIG. 9 is a cross-section of a lower tool assembly of the forming tool.
Figure 10:
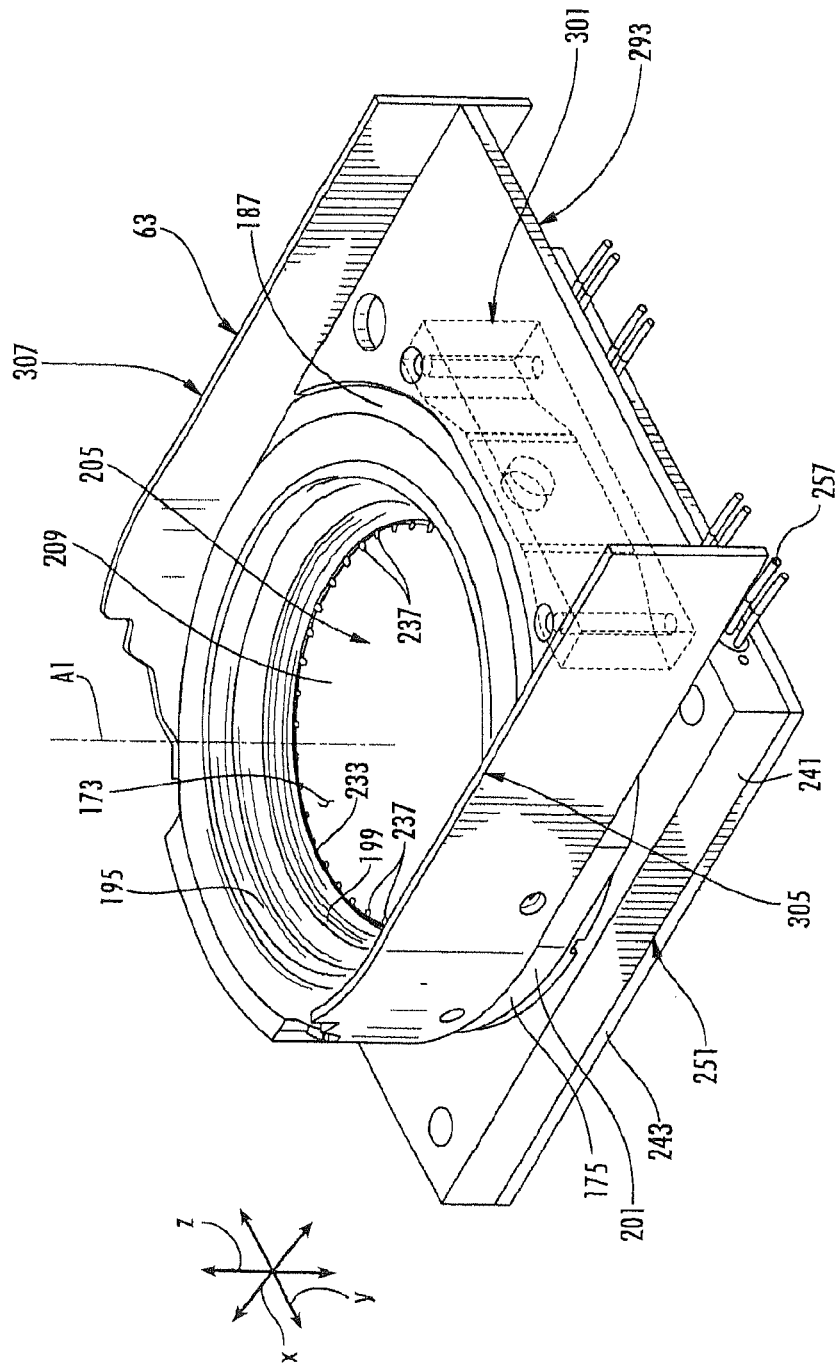
FIG. 10 is a perspective of the lower tool assembly.

As shown in FIGS. 5, 9, and 10, the lower tool assembly 63 includes a generally cylindrical cavity block or cavity 175 having an upper recess 179 with a radial shape to correspond with the shape of the cooking ring 1. The cavity block 175 has a generally cylindrical lower recess 183 (FIG. 9), an upper axial end surface 187, and a lower axial end surface 191. The upper recess 179 has an upper curved radial surface 195 adjacent the axial end surface 187 of the cavity block 175 and corresponding with the shape of the first curved portion 37 of the cooking ring 1. A lower curved radial surface 199 extends downward from the upper curved surface 195 and corresponds with the shape of the second curved portion 41 of the cooking ring 1. The cavity 175 can include radially directed vent holes (not shown) passing from an outer radial surface 201 of the cavity to the upper recess 179 to facilitate venting during formation of the cooking ring 1.

A knockout 205 is received in the lower recess 183 of the cavity block 175 and has a flat upper axial surface 209 that abuts the lower edge of the upper recess 179 at the closed position of the lower tool assembly 63 (FIGS. 5 and 9). The knockout 205 includes a generally cylindrical head 217 having a cylindrical shaft 225 received in a guide bushing 229 and extending axially from the cavity block 175. As shown in FIG. 6, the cylindrical head 217 includes a lip 233 (broadly "projection") forming the outer radial edge of the axial surface 209 of the knockout 205. The head 217 has spaced apart axial openings 237 spaced radially inward from the lip 233. The lip 233 facilitates clamping of the annular cutout 5 between the upper tool assembly 61 and lower tool assembly 63 during operation of the forming tool 15. The axial openings 237 create low-pressure cavities on the axial surface 209 of the knockout 205 that grip the annular cutout 5 by receiving portions of the annular cutout and prevent the cutout from sliding during formation of the cooking ring 1. The axial openings 237 in the knockout 205 can be otherwise shaped and/or omitted without departing from the scope of this invention.

A base plate 241 is attached to the lower axial surface 191 of the cavity block 175 and has an axial opening 245 that receives the guide bushing 229 and shaft 225 of the knockout 205. An insulator sheet 249 is attached to an axial end surface 251 of the base plate 241 and a heater 257 extends from an external radial surface 261 of the base plate for heating the lower tool assembly 63. A fitting 263 is attached to the cylindrical shaft 225 of the knockout 205 by a threaded connection between an upper portion 267 of the fitting and an inner surface 271 of an axial recess 275 in the lower end of the shaft. In the illustrated embodiment, a bolt 281 is threadably attached to a lower end of the fitting 263. When the lower tool assembly 63 is assembled for operation, the bolt 281 is removed and an actuator (e.g., air cylinder, not shown) is optionally attached to the fitting 263 to provide an actuating force to knockout 205. Alternatively, the lower tool assembly 63 could be fixedly mounted to a support (not shown) and the upper tool assembly 61 could be connected to an actuator for movement relative to the lower tool assembly.

The lower tool assembly 63 includes a blank support plate 293 supported on the base plate 241 by a table spacer 297 (FIG. 9). The blank support plate 293 is positioned so that an upper surface 301 of the plate supports the annular cutout 5 prior to the cutout being positioned on the upper axial surface 187 and above the upper recess 179 of the cavity block 175. The lower tool assembly 63 has two blank guides 305, 307 attached to opposite sides of the support plate 293. The blank guides 305, 307 (FIG. 10) each extend upward from the cavity block 175 and the support plate 293 so as to guide the annular cutout 5 into position between the upper and lower tool assemblies 61, 63 of the forming tool 15.

Figure 11C:
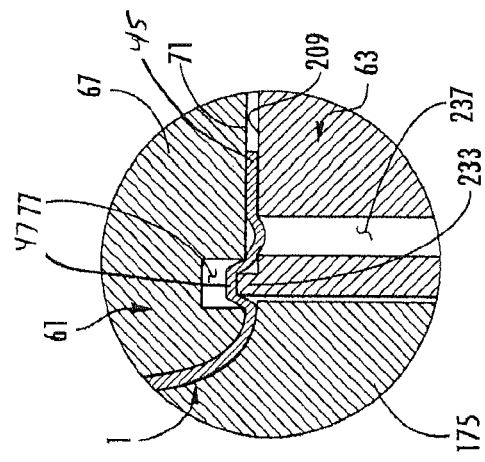
FIG. 11A-11C are enlarged portions of the forming tool showing various stages of formation of the cooking element from the annular cutout.
Figure 11B:
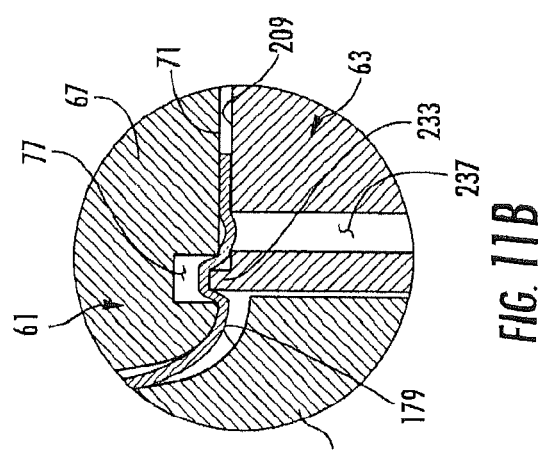
Figure 11A:
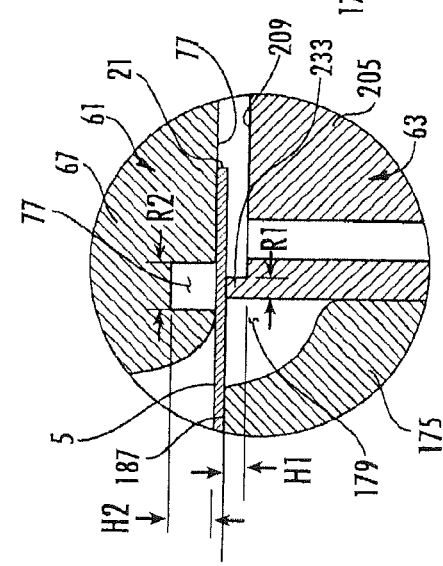

A method of forming the cooking ring 1 from annular cutout 5 is described below. The cooking ring 1 of the present invention is formed from the annular cutout 5 by feeding the cutout into the forming tool assembly 15 and operating the assembly to press and shape the cutout into the forming ring. FIGS. 11A-11C show the fully open, partially closed, and fully closed positions of the upper and lower tool assemblies 61, 63 and corresponding progression of the formation of the cooking ring 1 from the annular cutout 5. The forming tool assembly 15 is positioned downstream from a cutting die (not shown) that cuts the annular cutout 5 from a blank of material such as paperboard having microwave interactive material 9 attached thereto. The annular cutout 5 can be moistened to facilitate forming of the cooking ring 1. After the upper tool assembly 61 and lower tool assembly 63 have been separated from the position shown in FIG. 6, the annular cutout 5 is slid across the blank support plate 293 with its radial outer portion supported by the upper axial surface 187 of the cavity block 175 and its radial inner portion positioned above the upper recess 179 of the lower tool assembly 63. The annular cutout 5 is guided to the proper position on the lower tool assembly 63 by the blank guides 305, 307 attached to the sides of the blank support plate 293. A conveying mechanism, such as a conveyor belt or other suitable material handling mechanism, conveys the cutout to the proper position between the upper tool assembly 61 and lower tool assembly 63. At the fully open position of the upper and lower tool assemblies 61, 63 (FIG. 11A), the cutout 5 is supported by the axial end surface 187 of the cavity block 175 and the lip 233 of the knockout 205. As shown in FIG. 11A, the knockout 205 has been raised relative to the cavity block 175 so that the top surface of the lip 233 is approximately level with the axial end surface 187 of the cavity block.

After the cutout 5 is positioned above the upper recess 179 of the cavity block, the upper tool assembly 61 is actuated to initiate downward movement of the nose 67 and punch 109. As shown in FIG. 11B, the cutout 5 is initially pressed between the nose 67 and knockout 205 and engages the lip 233 so that the cutout is forced into the annular groove 77 of the nose 67. At this stage, the interference of the radial inner portion of the annular cutout 5 received in the annular groove 77 and the spacing between the annular groove and the lip 233 cause the annular cutout to be gripped and clamped between the upper and lower assemblies 63, 63 to prevent sliding of the cutout during formation of the cooking ring 1. As shown in FIG. 11C, the radial inner portion of the annular cutout 5 is gripped by the lip 233 and the groove 77 so that the inner radial edge 21 of the cutout stays in a fixed position as the cutting ring 1 is formed. The radial inner portion of the cutout 5 (generally corresponding to the upper edge portion 45 of the cooking element 1) stays substantially fixed as the radial outer portion of the cutout (generally corresponding to the first curved portion 37, second curved portion 41, and the lower edge portion 35 of the cooking element 1) is pressed by the nose 67 and punch 109 against the upper recess 179 of the cavity block 175 to complete the formation of the cooking ring 1.

The clamping feature of the lip 233 and groove 77 allows the forming tool assembly 15 to form a three-dimensional article from a blank 5 having a precut hole. The clamping feature holds the inner radial edge 21 of the blank 5 at a fixed location during formation of the blank into the cooking ring 1 having a three-dimensional shape. This clamping feature of the lip 233 and the groove 77 forms the annular groove 47 in the cooking ring 1 and effectively holds the blank to control the X and Y positioning of the annular cutout 5 as it moves during formation into the shape of the cooking ring 1. It also prevents the punch from pushing through hole 25 in the annular blank 5. Without the use of the clamping feature, a secondary cutting operation typically would be required to form the hole 25 in the three-dimensional article after the article is formed from the annular blank. Such an additional operation is undesirable since it would add costs and may reduce the quality of the article.

In addition to the capability of forming articles with a precut center hole in the paperboard blank, the X and Y position control of the blank during forming is beneficial to the forming of any three-dimensional article or container either with or without a center hole in the blank. For example, the forming tool 15 could form a container being otherwise shaped (e.g., round, oval, square, rectangular, etc.) from an appropriately sized and shaped blank. In one embodiment, the container could be a three dimensional container such as a tray having a bottom wall and at least one side wall.

As shown in FIG. 11A, the lip 233 may have a height H1 ranging from approximately 0.01 inches (0.25 mm) to approximately 0.05 inches (1.3 mm), more preferably about 0.03 inches (0.76 mm), and a radial length R1 from its inner radius to its outer radius of ranging from approximately 0.01 inches (0.25 mm) to approximately 0.05 inches (1.3 mm), more preferably about 0.03 inches (0.76 mm). The annular groove 77 may have a height H2 ranging from approximately 0.05 (1.3 mm) to approximately 0.11 inches (2.8 mm), more preferably about 0.08 inches (2.0 mm), and a radial length R2 ranging from approximately 0.05 inches (1.3 mm) to approximately 0.11 inches (2.8 mm), more preferably about 0.08 inches (2.0 mm). The foregoing dimension are illustrative of exemplary dimensions for the lip 233 and annular groove 77 that correspond to an annular blank 5 that is a laminated structure having a thickness of approximately 0.018 inches (0.46 mm). The present invention could be otherwise shaped and dimensioned to accommodate an annular blank having a thickness greater than or less than the 0.018 (0.46 mm) inches without departing from the scope of this invention. The dimensional information presented herein is intended to be illustrative of exemplary embodiments of the invention and is not intended to limit the scope of the invention.

The clamp ring 135 can be actuated simultaneously with actuation of the upper and/or lower tool assemblies 61, 63 by operating the actuators attached to the clamp ring brackets 153, 155 to apply compression force against the radial outer portion of the annular cutout 5 during formation of the cooking ring 1. The compression force applied by the clamp ring 135 creates uniform bunching of the score lines 27 as the score lines are formed into the pleats 49 during formation of the cooking ring 1. The compression force applied by the clamp ring 135 prevents excessive bunching of the annular cutout material. The forming tool assembly 15 forms the pleats 49 of the cooking ring 1 such that the pleats have a generally U-shaped cross-sectional shape rather than a Z-shaped cross-sectional shape which would result from excessive bunching and possibly fracturing, tearing, or weakening of the paperboard material and/or the microwave interactive material.

After the cooking ring 1 is shaped, the upper tool assembly 61 is raised and the cooking ring is ejected from the cavity block 175 of the lower assembly 63. The cooking ring 1 is then transported downstream of the forming tool assembly 15 by a conveying mechanism (e.g., conveyor belt) for packaging and/or shipment or for assembly into a finished food product package.

The upper tool assembly 61 and lower tool assembly 63 are commonly mounted at approximately a 45° angle in a machine (not shown) of the type manufactured by Peerless Machine & Tool Corporation in Marion, Ind., USA. The machine provides the primary compressive forces to sufficiently close and open the tool assemblies 61 and 63 of the present invention. The closing and opening of the tool assemblies 61, 63 by the machine forms the three-dimensional articles or containers such as cooking ring 1. In other types of machines, the tool assemblies 61, 63 may include minor revisions or modifications to permit the tool assemblies to operate in alternative orientations (e.g., upside down or on their side). It should be understood that the operating position of tool assemblies 61 and 63 shown and/or described herein is not intended to limit the scope of the invention.

As mentioned above, in accordance with the exemplary embodiment of the present invention, the microwave interactive material 9 may comprise a microwave interactive element such as a susceptor. Susceptors are discussed in greater detail below. Alternatively, the microwave interactive material 9 can comprise any other type of microwave interactive elements, materials, and/or various combinations of microwave interactive elements and material, as discussed in greater detail below. The microwave interactive elements and materials may be omitted from article 1 without departing from the scope of this invention.

For example, the microwave interactive material 9 may be formed at least partially from one or more microwave energy interactive elements (hereinafter sometimes referred to as "microwave interactive elements") that may promote browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular construct and food item.

The microwave interactive element may be supported on a microwave inactive or transparent substrate for ease of handling and/or to prevent contact between the microwave interactive material and the food item. As a matter of convenience and not limitation, and although it is understood that a microwave interactive element supported on a microwave transparent substrate includes both microwave interactive and microwave inactive elements or components, such constructs are referred to herein as "microwave interactive webs".

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable for use with the present invention include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide. Examples of metal oxides that may be suitable for use with the present invention include, but are not limited to, oxides of aluminum, iron, and tin, used in conjunction with an electrically conductive material where needed. Another example of a metal oxide that may be suitable for use with the present invention is indium tin oxide (ITO). ITO can be used as a microwave energy interactive material to provide a heating effect, a shielding effect, a browning and/or crisping effect, or a combination thereof. For example, to form a susceptor, ITO may be sputtered onto a clear polymeric film. The sputtering process typically occurs at a lower temperature than the evaporative deposition process used for metal deposition. ITO has a more uniform crystal structure and, therefore, is clear at most coating thicknesses. Additionally, ITO can be used for either heating or field management effects. ITO also may have fewer defects than metals, thereby making thick coatings of ITO more suitable for field management than thick coatings of metals, such as aluminum.

Alternatively, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In one example, the microwave interactive element may comprise a thin layer of microwave interactive material (generally less than about 100 angstroms in thickness, for example, from about 60 to about 100 angstroms in thickness) that tends to absorb at least a portion of impinging microwave energy and convert it to thermal energy (i.e., heat) at the interface with a food item. Such elements often are used to promote browning and/or crisping of the surface of a food item (sometimes referred to as a "browning and/or crisping element"). When supported on a film or other substrate, such an element may be referred to as a "susceptor film" or, simply, "susceptor". However, other microwave energy interactive elements, such as those described herein, are contemplated hereby.

As another example, the microwave interactive element may comprise a foil having a thickness sufficient to shield one or more selected portions of the food item from microwave energy (sometimes referred to as a "shielding element"). Such shielding elements may be used where the food item is prone to scorching or drying out during heating.

The shielding element may be formed from various materials and may have various configurations, depending on the particular application for which the shielding element is used. Typically, the shielding element is formed from a conductive, reflective metal or metal alloy, for example, aluminum, copper, or stainless steel. The shielding element generally may have a thickness of from about 0.000285 inches to about 0.05 inches. In one aspect, the shielding element has a thickness of from about 0.0003 inches to about 0.03 inches. In another aspect, the shielding element has a thickness of from about 0.00035 inches to about 0.020 inches, for example, 0.016 inches.

As still another example, the microwave interactive element may comprise a segmented foil or high optical density evaporated material (collectively referred to as "segmented foil"), such as, but not limited to, those described in U.S. Pat. Nos. 6,204,492, 6,433,322, 6,552,315, and 6,677,563, each of which is incorporated by reference in its entirety. Although segmented foils are not continuous, appropriately spaced groupings of such segments often act as a transmitting element to direct microwave energy to specific areas of the food item. Such foils also may be used in combination with browning and/or crisping elements, for example, susceptors.

Any of the numerous microwave interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food item selectively. The number, shape, size, and positioning of such breaks or apertures may vary for a particular application depending on type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void in the material used to form the construct, or may be a non-physical "aperture". A non-physical aperture may be a portion of the construct that is microwave energy inactive by deactivation or otherwise, or one that is otherwise transparent to microwave energy. Thus, for example, the aperture may be a portion of the construct formed without a microwave energy active material or, alternatively, may be a portion of the construct formed with a microwave energy active material that has been deactivated. While both physical and non-physical apertures allow the food item to be heated directly by the microwave energy, a physical aperture also provides a venting function to allow steam or other vapors to be released from the food item.

In some instances, it may be beneficial to create one or more discontinuities or inactive regions to prevent overheating or charring of the construct and/or food product, for example, by forming areas of the blank without a microwave energy interactive material, removing the microwave energy interactive material that has been applied, or by deactivating the microwave energy interactive material in these areas. Further still, one or more panels, portions of panels, or portions of the construct may be designed to be microwave energy inactive to ensure that the microwave energy is focused efficiently on the areas to be browned and/or crisped, rather than being lost to portions of the food item not intended to be browned and/or crisped or to the heating environment.

As stated above, any of the above elements and numerous others contemplated hereby may be supported on a substrate. The substrate typically comprises for example, a polymeric film or material. As used herein the term "polymer" or "polymeric material" includes, but is not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries.

The thickness of the film typically may be from about 35 gauge to about 10 mil. In one aspect, the thickness of the film is from about 40 to about 80 gauge. In another aspect, the thickness of the film is from about 45 to about 50 gauge. In still another aspect, the thickness of the film is about 48 gauge. Examples of polymeric films that may be suitable include, but are not limited to, polyolefins, polyesters, polyamides, polyimides, polysulfones, polyether ketones, cellophanes, or any combination thereof. Other non-conducting substrate materials such as paper and paper laminates, metal oxides, silicates, cellulosics, or any combination thereof, also may be used.

In one example, the polymeric film comprises polyethylene terephthalate (PET). Polyethylene terephthalate films are used in commercially available susceptors, for example, the QWIKWAVE® susceptor and the MICRORITE® susceptor laminations, both available from Graphic Packaging International (Marietta, Ga.). Examples of polyethylene terephthalate films that may be suitable for use as the substrate include, but are not limited to, MELLNEX®, commercially available from DuPont Teijan Films (Hopewell, Va.), SKYROL, commercially available from SKC, Inc. (Covington, Ga.), and BARRIALOX PET, available from Toray Films (Front Royal, Va.), and QU50 High Barrier Coated PET, available from Toray Films (Front Royal, Va.).

The polymeric film may be selected to impart various properties to the paper or paperboard web, for example, printability, heat resistance, or any other property. As one particular example, the polymeric film may be selected to provide a water barrier, oxygen barrier, or a combination thereof. Such barrier film layers may be formed from a polymer film having barrier properties or from any other barrier layer or coating as desired. Suitable polymer films may include, but are not limited to, ethylene vinyl alcohol, barrier nylon, polyvinylidene chloride, barrier fluoropolymer, nylon 6, nylon 6,6, coextruded nylon 6/EVOH/nylon 6, silicon oxide coated film, barrier polyethylene terephthalate, or any combination thereof.

One example of a barrier film that may be suitable for use with the present invention is CAPRAN® EMBLEM 1200M nylon 6, commercially available from Honeywell International (Pottsville, Pa.). Another example of a barrier film that may be suitable is CAPRAN® OXYSHIELD OBS monoaxially oriented coextruded nylon 6/ethylene vinyl alcohol (EVOH)/nylon 6, also commercially available from Honeywell International. Yet another example of a barrier film that may be suitable for use with the present invention is DARTEK® N-201 nylon 6,6, commercially available from Enhance Packaging Technologies (Webster, N.Y.). Additional examples include BARRIALOX PET, available from Toray Films (Front Royal, Va.) and QU50 High Barrier Coated PET, available from Toray Films (Front Royal, Va.), referred to above.

Still other barrier films include silicon oxide coated films, such as those available from Sheldahl Films (Northfield, Minn.). Thus, in one example, a susceptor may have a structure including a film, for example, polyethylene terephthalate, with a layer of silicon oxide coated onto the film, and ITO or other material deposited over the silicon oxide. If needed or desired, additional layers or coatings may be provided to shield the individual layers from damage during processing.

The barrier film may have an oxygen transmission rate (OTR) as measured using ASTM D3985 of less than about 20 cc/m2/day. In one aspect, the barrier film has an OTR of less than about 10 cc/m2/day. In another aspect, the barrier film has an OTR of less than about 1 cc/m2/day. In still another aspect, the barrier film has an OTR of less than about 0.5 cc/m2/day. In yet another aspect, the barrier film has an OTR of less than about 0.1 cc/m2/day.

The barrier film may have a water vapor transmission rate (WVTR) of less than about 100 g/m2/day as measured using ASTM F1249. In one aspect, the barrier film has WVTR of less than about 50 g/m2/day. In another aspect, the barrier film has a WVTR of less than about 15 g/m2/day. In yet another aspect, the barrier film has a WVTR of less than about 1 g/m2/day. In still another aspect, the barrier film has a WVTR of less than about 0.1 g/m2/day. In a still further aspect, the barrier film has a WVTR of less than about 0.05 g/m2/day.

Other non-conducting substrate materials such as metal oxides, silicates, cellulosics, or any combination thereof, also may be used in accordance with the present invention.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item.

For example, the microwave energy interactive material may be provided as a continuous or discontinuous layer or coating including circles, loops, hexagons, islands, squares, rectangles, octagons, and so forth. Examples of various patterns and methods that may be suitable for use with the present invention are provided in U.S. Pat. Nos. 6,765,182; 6,717,121; 6,677,563; 6,552,315; 6,455,827; 6,433,322; 6,414,290; 6,251,451; 6,204,492; 6,150,646; 6,114,679; 5,800,724; 5,759,422; 5,672,407; 5,628,921; 5,519,195; 5,424,517; 5,410,135; 5,354,973; 5,340,436; 5,266,386; 5,260,537; 5,221,419; 5,213,902; 5,117,078; 5,039,364; 4,963,424; 4,936,935; 4,890,439; 4,775,771; 4,865,921; and Re. 34,683, each of which is incorporated by reference herein in its entirety. Although particular examples of patterns of microwave energy interactive material are shown and described herein, it should be understood that other patterns of microwave energy interactive material are contemplated by the present invention.

The microwave interactive element or microwave interactive web may be joined to or overlie a dimensionally stable, microwave energy transparent support (hereinafter referred to as "microwave transparent support", "microwave inactive support" or "support") to form the construct.

In one aspect, for example, where a rigid or semi-rigid construct is to be formed, all or a portion of the support may be formed at least partially from a paperboard material, which may be cut into a blank prior to use in the construct. For example, the support may be formed from paperboard having a basis weight of from about 60 to about 330 lbs/ream, for example, from about 80 to about 140 lbs/ream. The paperboard generally may have a thickness of from about 6 to about 30 mils, for example, from about 12 to about 28 mils. In one particular example, the paperboard has a thickness of about 18 mils and a basis weight of from about 100 lbs/ream to about 300 lbs/ream. Any suitable paperboard may be used, for example, a solid bleached or solid unbleached sulfate board, such as SUS® board, commercially available from Graphic Packaging International.

In another aspect, where a more flexible construct is to be formed, the support may comprise a paper or paper-based material generally having a basis weight of from about 15 to about 60 lbs/ream, for example, from about 20 to about 40 lbs/ream. In one particular example, the paper has a basis weight of about 25 lbs/ream.

Optionally, one or more portions of the various blanks or other constructs described herein or contemplated hereby may be coated with varnish, clay, or other materials, either alone or in combination. The coating may then be printed over with product advertising or other information or images. The blanks or other constructs also may be coated to protect any information printed thereon.

Furthermore, the blanks or other constructs may be coated with, for example, a moisture and/or oxygen barrier layer, on either or both sides, such as those described above. Any suitable moisture and/or oxygen barrier material may be used in accordance with the present invention. Examples of materials that may be suitable include, but are not limited to, polyvinylidene chloride, ethylene vinyl alcohol, DuPont DARTEK™ nylon 6,6, and others referred to above.

Alternatively or additionally, any of the blanks or other constructs of the present invention may be coated or laminated with other materials to impart other properties, such as absorbency, repellency, opacity, color, printability, stiffness, or cushioning. For example, absorbent susceptors are described in U.S. Provisional Application No. 60/604,637, filed Aug. 25, 2004, and U.S. Patent Application Publication No. 2006/0049190, published Mar. 9, 2006, both of which are incorporated herein by reference in their entirety. Additionally, the blanks or other constructs may include graphics or indicia printed thereon.

It will be understood that with some combinations of elements and materials, the microwave interactive element may have a grey or silver color this is visually distinguishable from the substrate or the support. However, in some instances, it may be desirable to provide a web or construct having a uniform color and/or appearance. Such a web or construct may be more aesthetically pleasing to a consumer, particularly when the consumer is accustomed to packages or containers having certain visual attributes, for example, a solid color, a particular pattern, and so on. Thus, for example, the present invention contemplates using a silver or grey toned adhesive to join the microwave interactive elements to the substrate, using a silver or grey toned substrate to mask the presence of the silver or grey toned microwave interactive element, using a dark toned substrate, for example, a black toned substrate, to conceal the presence of the silver or grey toned microwave interactive element, overprinting the metallized side of the web with a silver or grey toned ink to obscure the color variation, printing the non-metallized side of the web with a silver or grey ink or other concealing color in a suitable pattern or as a solid color layer to mask or conceal the presence of the microwave interactive element, or any other suitable technique or combination thereof.

As another example, the microwave interactive material 9 includes one or more susceptors as well as closed cells formed between layers of packaging material. Upon exposure to microwave energy, the cells expand to form inflated cells that thermally insulate the food item in the package from the environment exterior to the package. In addition, the inflated cells can force one or more susceptors into contact with, or at least closer to, the food being heated, cooked, or the like. One example of a microwave packaging material that provides inflatable cells is described in PCT application PCT/US03/03779 titled "Insulating Microwave Interactive Packaging", the entire disclosure of which is hereby incorporated by reference herein.

The foregoing description of the invention illustrates and describes various embodiments of the present invention. As various changes could be made in the above construction without departing from the scope of the invention, it is intended that all matter contained in the above description or shown in the accompanying drawings shall be interpreted as illustrative and not in a limiting sense. Furthermore, the scope of the present invention covers various modifications, combinations, and alterations, etc., of the above-described embodiments that are within the scope of the claims. Additionally, the disclosure shows and describes only selected embodiments of the invention, but the invention is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the invention without departing from the scope of the invention.

What is claimed is:

1. A method of forming a cooking element from an annular cutout having an outer edge and an inner edge defining a center opening, the method comprising:
   providing a tool comprising a first tool assembly and a second tool assembly, the first and second tool assemblies having a cooperating clamping feature,
   obtaining the annular cutout comprising material to be formed into the cooking element and having the outer edge and the inner edge defining the center opening;
   clamping the annular cutout between the clamping feature of the first tool assembly and the second tool assembly;
   positioning the first and second tool assemblies in a closed position to press the annular cutout between the tool assemblies to grip the annular cutout around the center opening and form the annular cutout into the cooking element while maintaining a portion of the annular cutout comprising the inner edge in a substantially fixed position.

2. The method of claim 1 wherein the first tool assembly comprises a nose having an external surface shaped to generally correspond to at least a portion of the cooking element and the second tool assembly comprises a cavity block having a recess, the positioning the first and second tool assemblies comprises pressing the annular cutout between the nose and the cavity block to form the annular cutout into the cooking element.

3. The method of claim 2 wherein the second tool assembly comprises a knockout axially moveable with respect to the cavity block and having a lip projecting from an external surface of the knockout, the first tool assembly comprises a groove on the external surface of the nose, the clamping the annular cutout comprises contacting the annular cutout with the external surface of the nose and the lip and forcing the lip and a portion of the annular cutout into the groove.

4. The method of claim 3 wherein the clamping the annular cutout comprises downwardly moving the nose to force the portion of the annular cutout into the grove and the positioning the first and second tool assemblies comprises further downwardly moving the nose to force the annular cutout into the recess and form the annular cutout into the cooking element.

5. The method of claim 3 wherein the external surface of the knockout is an axial surface, and the lip comprises an outer radial edge of the axial surface.

6. A cooking element formed from an annular cutout having an outer edge and an inner edge defining a center opening, the cooking element formed by a method comprising:
   providing a tool comprising a first tool assembly and a second tool assembly, the first and second tool assemblies having a cooperating clamping feature,
   obtaining the annular cutout comprising material to be formed into the cooking element and having the outer edge and the inner edge defining the center opening;
   clamping the annular cutout between the clamping feature of the first tool assembly and the second tool assembly;
   positioning the first and second tool assemblies in a closed position to press the annular cutout between the tool assemblies to grip the annular cutout around the center opening and form the annular cutout into the cooking element while maintaining a portion of the annular cutout comprising the inner edge in a substantially fixed position.

7. The cooking element of claim 6 wherein the cooking element has a flat upper edge portion, a flat lower edge portion, and at least one curved portion between the upper and lower edge portion.

8. The cooking element of claim 7 wherein the cooking element comprises a microwave interactive material.

9. A method of forming a cooking element, the method comprising:
   obtaining a tool comprising a first tool assembly and a second tool assembly;
   cutting an annular cutout from a blank, the annular cutout having an outer radial edge, an inner radial edge, and an opening adjacent the inner radial edge;
   positioning the tool in an open position wherein the first tool assembly and the second tool assembly are spaced apart to form a receiving space therebetween;
   conveying the annular cutout to the tool in the open position and placing the cutout between the first and second tool assembly;
   closing the tool such that the annular cutout is gripped by the first tool assembly and the second tool assembly around the inner radial edge and the opening so that the first and second tool assemblies form the annular cutout into a cooking ring.

10. The method of claim 9 wherein the first tool assembly comprises a nose having an external surface shaped to generally correspond to at least a portion of the cooking element and the second tool assembly comprises a cavity block having a recess, the closing the tool comprises pressing the cutout between the nose and the cavity block to shape the annular cutout into the cooking element.

11. The method of claim 10 wherein the second tool assembly comprises a knockout axially moveable with respect to the cavity block, the closing the tool comprises initially gripping a portion of the annular cutout between the nose and the knockout prior to shaping the annular cutout into the cooking element.

12. The method of claim 10 wherein an inner radial edge portion of the annular cutout is initially gripped between the nose and the knockout.

13. The method of claim 10 wherein the first tool assembly comprises a groove on the external surface of the nose and a lip projecting from an external surface of the knockout, the initially gripping the portion of the annular cutout comprises contacting the annular cutout with the external surface of the nose and the lip to force the lip and a portion of the cutout into the groove.

14. The method of claim 13 wherein the external surface of the knockout is an axial surface, and the lip comprises an outer radial edge of the axial surface.

15. The method of claim 10 wherein the initially gripping the portion of the annular cutout comprises downwardly moving the nose and the closing the tool comprises further downward movement of the nose to effect downward movement of the knockout during forming of the annular cutout into the cooking ring.

16. A cooking element formed by a method comprising:
   obtaining a tool comprising a first tool assembly and a second tool assembly;
   cutting an annular cutout from a blank, the annular cutout having an outer radial edge, an inner radial edge, and an opening adjacent the inner radial edge;
   positioning the tool in an open position wherein the first tool assembly and the second tool assembly are spaced apart to form a receiving space therebetween;
   conveying the annular cutout to the tool in the open position and placing the cutout between the first and second tool assembly;
   closing the tool such that the annular cutout is gripped by the first tool assembly and the second tool assembly around the inner radial edge and the opening so that the first and second tool assemblies form the annular cutout into a cooking ring,
   wherein the cooking element has a flat upper edge portion, a flat lower edge portion, and at least one curved portion between the upper and lower edge portion.

17. The cooking element of claim 16 wherein the cooking element comprises a microwave interactive material.

* * * * *